June 12, 1951     H. F. GEIST     2,556,754
BLOCK FORMING APPARATUS
Filed Feb. 9, 1949
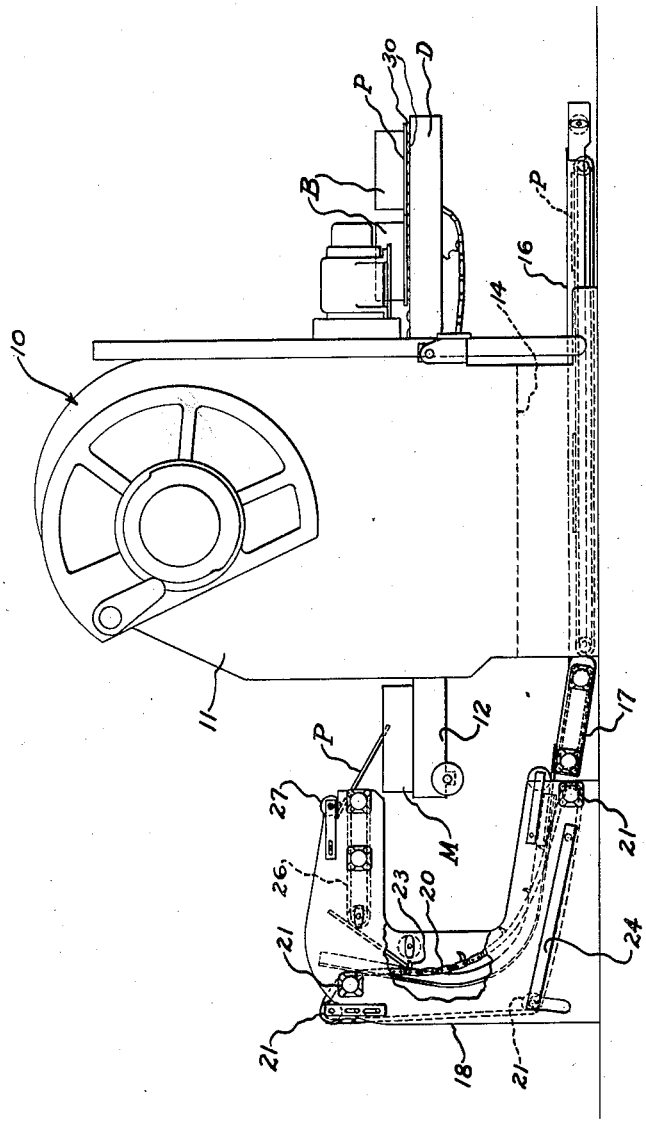
INVENTOR.
HERBERT F. GEIST
BY
*Fay, Golrick & Fay*
ATTORNEYS Patented June 12, 1951

2,556,754

UNITED STATES PATENT OFFICE 2,556,754

BLOCK FORMING APPARATUS

Herbert F. Geist, Lakewood, Ohio, assignor to Geist Brothers, Cleveland, Ohio, a partnership Application February 9, 1949, Serial No. 75,450

4 Claims. (Cl. 25—41)

The present invention relates to an apparatus for forming monolithic building blocks and more particularly to apparatus for forming such blocks on pallets and in which the loading of empty pallets into the machine and the removal of the loaded pallets therefrom is greatly facilitated.

An object of the present invention is to provide a building block forming apparatus which is adapted to discharge pallets with formed blocks thereon onto a discharge platform of the machine and which has an empty pallet receiving conveyor located immediately beneath the discharge platform whereby empty pallets may be deposited on to the conveyor at the same station the removal of the loaded pallets is effected, the conveyor being adapted to carry the empty pallets to a magazine in the machine.

A further object of the invention is to provide a compact machine of the character referred to in the preceding paragraph and in which the conveyor extends beneath the block forming portion of the machine and emerges on the opposite side of the machine from whence the pallets are elevated to the magazine of the machine.

Other objects and advantages of the invention will be apparent from the following description of a preferred form of the invention, reference being made to the drawing wherein a block forming machine is shown in side elevation with a portion thereof broken away for the sake of clarity.

In the drawings a side elevational view of a block forming machine of the type to which my invention is adaptable, is shown with my invention incorporated.

It has been the practice to form concrete blocks, or other monolithic blocks, in machines consisting generally of a bed having a conveyor for supporting a flat metal pallet upon which the concrete blocks are formed by molding mechanisms. The machines are adapted to automatically feed a pallet from a magazine holding a number of stacked pallets and place the pallet beneath the molding apparatus of the machine. After the block has been molded on the pallet the machine passes the loaded pallet to a discharge platform from whence the pallet loaded is removed and placed upon a rack with a number of similarly loaded pallets and the rack is subsequently removed to a drying room where the blocks are hardened. After the blocks harden they are removed from the pallets to a storage pile or otherwise disposed of and the empty pallets are then returned to the magazine of the block forming machine. The metal pallets must be rigid since they constitute the bottom wall of the mold when the blocks are being formed and they are therefore made of relatively heavy steel plate which is difficult and unwieldy for manual manipulation. There has been devised power operated fork devices for lifting the loaded pallets from the machines and depositing them in racks. This same fork mechanism may also be made to pick up the empty pallets on the rack and return them to the magazine side of the machine which is generally located on the opposite side of the machine from the discharge platform. The arrangement of the block forming machines are such, however, that considerable labor and time is consumed handling the empty pallets and in loading the magazines. By my invention I have provided a block forming machine in which a pallet receiving station is located immediately beneath the loaded pallet discharge platform so that the empty pallets may be placed in the machine at the same station as the removal of the loaded pallets. Thus it is made possible for one operator to both load a rack with pallets carrying green blocks and unload empty pallets from the same rack while remaining at the block discharge side of the machine.

Referring now to the drawing, I have illustrated a preferred form of the invention and I have shown a concrete block forming machine indicated generally at 10. This machine may be similar to a machine manufactured by the Besser Manufacturing Company of Alpena, Michigan, and known as the "Besser Super Vibrapac." Many details of this machine are not shown here as they do not form a part of the invention, it being sufficient to say that the machine comprises a frame structure 11 which houses a bed, part of which is shown at 12, which is adapted to support flat pallets indicated at P while a concrete block is molded thereon. The empty pallets are placed in a magazine M and the loaded pallets are discharged on a platform D.

The machine 10 is provided with a passageway or opening beneath the bed and extending in the direction of travel of the pallets through the machine. The top of the opening is indicated at 14.

A section 16 of a power driven chain type conveyor is adapted to extend through the opening with one end thereof directly beneath the discharge platform D. The conveyor is adapted to be driven, by a motor, not shown, to carry empty pallets on the upper reach thereof through the opening through the machine and to discharge the pallets on to an intermediate conveyor section 17 which directs the pallets into a C-shaped conveyor 18 which is adapted to carry the pallets upwardly and laterally to deposit them into the magazine M. The conveyor 18 comprises a C-shaped frame 19 which supports a pair of parallel chains 20 which are mounted on suitable sets of sprockets 21 for causing the chain to sweep upwardly in an arc, and the chain is provided with a series of spaced lugs 23 which are adapted to catch an edge of the pallets and raise the pallets upwardly as may be seen by inspection of the drawing. Preferably, one set of the sprockets 21a is mounted on a weighted arm 24 which may move in a limited arc for maintaining the chain in mesh with the sprockets when the conveyor is free of the weight of the pallets.

At the upper part of the frame there are conveyor chains 26 which extend on a horizontal reach and are adapted to receive pallets from the chains 20 and to move them over the magazine M as illustrated. Preferably, a set of rollers 27 is provided for causing the pallets to drop into the magazine M in an orderly, stacked relationship.

For the sake of clarity I have not shown the power mechanism for driving the conveyors described, but it is to be understood that any suitable drive may be provided and many of such are well known in the art.

In operation of the machine, the empty pallets from the magazine are automatically carried into the machine onto bed 12 where the blocks are molded thereon, after which the loaded pallets are moved on to the platform D. The platform D consists of two parallel cantilever members which have rollers 30 journalled thereon which support the pallets adjacent the edges thereof. The operator may then remove the loaded pallets by inserting a power fork between the cantilever members and beneath the pallets, and place them in to a suitable rack, and upon return to the machine he may carry with him an empty pallet from the rack and deposit it on to the conveyor 18 immediately beneath the platform D as he performs the operation of removing the succeeding loaded pallet. The empty pallets so positioned will be carried beneath the machine, elevated and deposited into the magazine.

It will be apparent that with the arrangement shown and described the block forming machine may be loaded and unloaded with a minimum of motion and effort on the part of the operator and it particularly lends itself to the efficient use of fork mechanisms which are capable of depositing empty pallets in the machine and which are also used to pick up the loaded pallets, these operations taking place on the same side of the machine. It will be observed that the conveyor mechanism, by passing beneath the block forming bed and within the confines of the machine, will occupy a medium of space thereby increasing the efficiency and utility of the block forming machine. Also, it will be apparent that further saving of labor on the part of the operator in manipulating the fork conveyor can be effected by the use of special fork arrangement which will permit the operator to deposit a loaded pallet on the rack pickup and engage and withdraw an empty pallet on the rack shelf immediately below the loaded pallet just deposited in the rack.

As the pallets are transferred from the elevator to the short conveyor leading to the magazine they become reversed, thus causing all loose debris remaining from prior molding operations to be discharged to the floor or a suitable receptacle.

Although I have described but one form of the invention, it will be understood that other forms might be adopted, all falling within the scope of the claims which follow.

I claim:

1. A block forming apparatus comprising, a frame; a bed in the frame; a block molding mechanism mounted on said bed and being adapted to mold a block on a pallet on said bed; a pallet magazine at one end of the bed and a discharge platform at the opposite end of the bed; a conveyor system associated with the foregoing stated bed, magazine and platform for moving a pallet from the magazine to beneath the block molding mechanism and from the block molding mechanism to the disharge platform in substantially the same plane; and a power driven pallet conveyor system extending from beneath said discharge platform and operable in a direction reverse to the first stated conveyor system for moving empty pallets from the block discharging side of the apparatus to the magazine side and including a pallet elevator means adjacent to the magazine and a magazine feeding conveyor section interposed between the upper reach of the elevator section and the magazine, said elevator means being adapted to invert the pallets and drop them onto said magazine feeding conveyor section.

2. A block forming apparatus comprising a frame, a pallet conveyor bed in the frame; a block molding mechanism mounted on said frame over said conveyor bed and being adapted to mold a block on a pallet on said conveyor bed; a pallet magazine at one end of the bed and a discharge platform at the opposite end of the bed; a conveyor system associated with the foregoing stated conveyor bed, magazine and discharge platform, for moving a pallet substantially in a plane from the magazine to beneath the block molding mechanism and from the block molding mechanism to the discharge platform; and a power-driven pallet return conveyor system extending from beneath said discharge platform and operable in a direction reverse to the first stated conveyor system for moving empty pallets from the block discharging side of the apparatus to the magazine side, and including a substantially horizontal conveyor section extending from beneath the discharge platform through the frame, an elevator section at the magazine end of the apparatus, upon which the horizontal section discharges, and a magazine feeding conveyor section extending laterally from the elevator section to the magazine, said elevator section being adapted to carry the pallets above the level of the magazine feeding conveyor section and to cause the pallets to be inverted and dropped onto said magazine feeding conveyor section, thereby cleaning the pallet of molding debris.

3. A block forming apparatus comprising a frame, a pallet conveyor bed in the frame; a block molding mechanism mounted on said frame over said conveyor bed and being adapted to mold a block on a pallet on said conveyor bed; a pallet magazine at one end of the bed and a discharge platform at the opposite end of the bed, a conveyor system associated with the foregoing stated conveyor bed, magazine and discharge platform, for moving a pallet substantially in a plane from the magazine to beneath the block molding mechanism and from the block molding mechanism to the discharge platform; and a power-driven pallet return conveyor system extending from beneath said discharge platform and operable in a direction reverse to the first stated conveyor system for moving empty pallets from the block discharging side of the apparatus to the magazine side, and including a substantially horizontal conveyor section from beneath the discharge platform through the frame, an elevator section at the magazine end of the apparatus onto which said horizontal section discharges, and a magazine feeding conveyor section interposed between the elevator section and the magazine, said elevator section comprising a pallet directing frame beginning at the level of the horizontal section, curving upwardly and slightly reflexly from the vertical toward the magazine feeding conveyor to terminate above the level of the magazine feeding conveyor section and an endless chain mechanism provided with pallet edge engaging lugs adapted to move a pallet along and up said directing frame to a point where the reflex inclination of the frame causes the pallet to tilt backward and drop upon the magazine feeding conveyor.

4. In a block forming apparatus having a pallet magazine, a block molding mechanism for molding a block on a pallet, and a pallet advancing system to move a pallet in substantially the same plane from the magazine, under the molding mechanism and onto a discharge platform; a pallet return conveyor system comprising a substantially horizontal conveyor section extending beneath the discharge platform, the pallet advancing system and the magazine, said conveyor being operable in a direction reverse to said pallet advancing system, an elevator section at the magazine end of the apparatus onto which said horizontal section discharges and a magazine feeding conveyor interposed between the elevator section and the magazine; said elevator section comprising a pallet directing frame beginning at the level of the horizontal section, curving upwardly and reflexly from the vertical toward the magazine feeding conveyor to terminate above the level of the magazine feeding conveyor and an endless chain mechanism provided with pallet engaging lugs adapted to move pallets along said frame.

HERBERT F. GEIST.

REFERENCES CITED

The following references are of record in the file of this patent:

UNITED STATES PATENTS

| Number | Name | Date |
|---|---|---|
| 1,350,604 | Graham | Aug. 24, 1920 |
| 1,357,315 | Dupuy | Nov. 2, 1920 |
| 1,779,136 | Martin | Oct. 21, 1930 |
| 1,919,807 | Sharpe | July 25, 1933 |